United States Patent [19]

Yamada

[11] Patent Number: 5,194,336
[45] Date of Patent: Mar. 16, 1993

[54] CHROMATICALLY COLORED FLUORORESIN-COATED MATERIAL

[75] Inventor: Katsuya Yamada, Osaka, Japan

[73] Assignee: Sumitomo Electric Industries Ltd., Osaka, Japan

[21] Appl. No.: 626,592

[22] Filed: Dec. 12, 1990

[30] Foreign Application Priority Data

Dec. 16, 1989 [JP] Japan .................................. 1-326682

[51] Int. Cl.$^5$ .......................... B32B 27/00; B32B 5/16; B32B 15/08; B60R 13/00
[52] U.S. Cl. ..................................... 428/421; 428/31; 428/324; 428/422; 428/463
[58] Field of Search ............... 428/421, 422, 324, 463, 428/31

[56] References Cited

U.S. PATENT DOCUMENTS

| | | | |
|---|---|---|---|
| 4,177,320 | 12/1979 | Yoshimura et al. | 428/422 X |
| 4,931,324 | 6/1990 | Ellison et al. | 428/31 |
| 4,954,589 | 9/1990 | Sugawara et al. | 526/255 |

FOREIGN PATENT DOCUMENTS

| | | |
|---|---|---|
| 0022256 | 1/1981 | European Pat. Off. . |
| 0022257 | 1/1981 | European Pat. Off. . |
| 0343015 | 11/1989 | European Pat. Off. . |
| 0389966 | 10/1990 | European Pat. Off. . |
| WO81/00972 | 4/1981 | World Int. Prop. O. . |

*Primary Examiner*—Paul J. Thibodeau
*Assistant Examiner*—Leszek Kiliman
*Attorney, Agent, or Firm*—Sughrue, Mion, Zinn, Macpeak & Seas

[57] ABSTRACT

A chromatically colorable fluororesin coated material is disclosed, which comprises a metallic substrate having thereon (1) a first layer comprising a first fluororesin composition containing from 10 to 40% by weight, based on the total solid amount of the first fluororesin composition, of a heat-resistant high-molecular weight material; and having further thereon (2) a second layer comprising a second fluororesin composition containing from 1 to 7% by weight, based on the total solid amount of the second fluororesin composition, of mica having a particle size of from 5 to 200 μm and having an inorganic pigment-coated surface, and containing neither any inorganic pigment having a particle size of smaller than 5 μm or larger than 200 μm nor any heat-resistant high-molecular material, the inorganic pigment with which the surface of the mica is coated being at least one member selected from the group consisting of the following members (a) to (d):
(a) a transparent inorganic pigment which is coated with an optical thickness of from 0.2 to 0.4 μm,
(b) an opaque inorganic pigment,
(c) a mixture of a transparent inorganic pigment and an opaque inorganic pigment, and
(d) a laminate of a transparent inorganic pigment and an opaque inorganic pigment.

6 Claims, 1 Drawing Sheet

CHROMATICALLY COLORED FLUORORESIN-COATED MATERIAL

FIELD OF THE INVENTION

This invention relates to a chromatically colorable fluororesin-coated material. More particularly, it relates to a chromatically colorable fluororesin-coated material which meets requirements of surface non-tackiness and a chromatically colored excellent appearance while maintaining excellent wear resistance.

BACKGROUND OF THE INVENTION

Fluororesins have been widely used in the fields of kitchen utensils such as frying pans, pans, hot plates, inner pots for rice cooker-warmers, etc., food containers, electric appliances, food industry, electrical industry, engineering industry, etc., because they are excellent in non-tackiness and chemical resistance. The coatings of conventional fluororesin-coated materials are mostly transparent so that the colors of substrates are seen through the coatings, or the colors thereof are mainly monotone such as white, gray or black. Only metallic tones can be obtained at most by imparting metallic luster thereto even if they can be colored.

However, the needs of the colors of general-purpose goods, particularly-household articles, have been increased in recent years. For example, refrigerators which allow colors thereof to be ordered are on sale. That is, colors which have been conventionally considered as a secondary function are made to be an essential element.

Fluororesins have excellent chemical resistance and are not dissolved in most of solvents. Conventionally, aqueous dispersions of fluororesins or powders thereof have been coated on materials and then backed at a high temperature to produce coated materials. Hence, organic coloring materials such as dyes could not be used because they are denatured by heat. On the other hand, when the fluororesins are colored with inorganic pigments such as red iron oxide and ultramarine, there are disadvantages that when small amounts thereof are used, a sufficient color cannot be formed, while when large amounts thereof are blended, important functions such as surface non-tackiness, etc. are greatly deteriorated.

When the inorganic pigments are used in a relatively small amount which do not damage the important functions, only monotone color such as white, gray or black can be obtained by blending carbon black or titanium oxide capable of forming a good color by harmonizing with the colors of substrate materials.

Mica, which has provided satisfactory results for many years as sliding materials, is blended with fluororesin compositions to be coated on articles which require wear resistance, such as frying pans, so as to improve the wear resistance, and a metallic color tone is obtained as a secondary effect. However, when only mica is blended, the hiding power of mica as a pigment is poor, and hence considerable non-uniformity in color is produced by the unevenness of the thickness of coating. Accordingly, metallic powder, silica, alumina, carbon or titanium oxide is commonly used in combination with mica.

Such combinations are described, e.g., in JP-A-52-10386 (the term "JP-A" as used herein means an "unexamined published Japanese patent application), published PCT Patent Application (Japan) No. 56-501277 and JP-A-56-103256. There are disclosed that metal flakes, mica or pigment-coated mica is blended with fluororesins in order to improve coating strength such as scratch resistance and wear resistance, without the exception that metallic powder, silica, alumina, carbon or titanium oxide in an amount commonly added is used in combination therewith so as to prevent non-uniformity in color from being caused. Further, the addition of a heat-resistant high-molecular material is often essential.

In JP-A-52-10386 and published PCT Patent Application (Japan) No. 56-501277, non-tackiness inherent in fluororesins are greatly deteriorated because such additives are employed. Therefore, the necessity to provide a top coat composed of only a fluororesin or a top coat containing a reduced amount of mica on the surface arises, or it is necessary that the use of such blends is limited to only a subbing layer for the coating of fluororesins as described in JP-A-56-103257. With regard to color tone, only monotone type metallic color is obtained at present because the amounts of pigments to be blended are limited to a certain range in order to minimize a lowering in adhesion to the substrate and non-tackiness as similar to the case of the compositions containing no mica.

Attempts to improve wear resistance have been made by the structure of coating. For example, an improvement in wear resistance has been made by coating a primer containing a heat-resistant high-molecular weight material on a metallic substrate and then coating a fluororesin composition containing mica thereon. This is because the high-molecular weight material contained in the primer is firmly bonded to the substrate and an effect of greatly improving wear resistance is exhibited by a synergistic effect with mica coated thereon. This technique is a conventional method which is applied to most of commercial available articles of fluororesin coated materials which require were resistance at present. However, only monotone type metallic color is obtained as described above.

SUMMARY OF THE INVENTION

As object of the present invention is to provide a chromatically colorable fluororesin-coated material which is free from the problems associated with the prior art and gives a chromatically colored appearance without causing lowering in surface non-tackiness while maintaining excellent wear resistance.

The present invention relates to a chromatically colorable fluororesin coated material which comprises a metallic substrate having thereon (1) a first layer comprising a first fluororesin composition containing from 10 to 40% by weight, based on the total solid amount of the first fluororesin composition, of a heat-resistant high-molecular weight material; and having further thereon (2) a second layer comprising a second fluororesin composition containing from 1 to 7% by weight, based on the total solid amount of the second fluororesin composition, of mica having a particle size of from 5 to 200 μm and having an inorganic pigment-coated surface, and containing neither any inorganic pigment having a particle size of smaller than 5 μm or larger than 200 μm nor any heat-resistant high-molecular material, the inorganic pigment with which the surface of the mica is coated being at least one member selected from the group consisting of the following members (a) to (d):

(a) a transparent inorganic pigment which is coated with an optical thickness of from 0.2 to 0.4 μm,
(b) an opaque inorganic pigment,
(c) a mixture of transparent inorganic pigment and an opaque inorganic pigment, and
(d) a laminate of a transparent inorganic pigment and an opaque inorganic pigment.

The optical thickness used herein refers to the product of the geometrical thickness and the refractive index.

The following preferred embodiments are included in the present invention.

(a) A chromatically colorable fluororesin-coated material according to the present invention, in which the opaque inorganic material is iron oxide and the transparent inorganic pigment is titanium oxide.

(b) A chromatically colorable fluororesin-coated material according to the present invention, in which the metallic substrate has fine recessed and protruded parts formed by electrochemical etching and is aluminum or an aluminum alloy, the surface of which is coated with hard alumite.

DETAILED DESCRIPTION OF THE INVENTION

Figure 1:
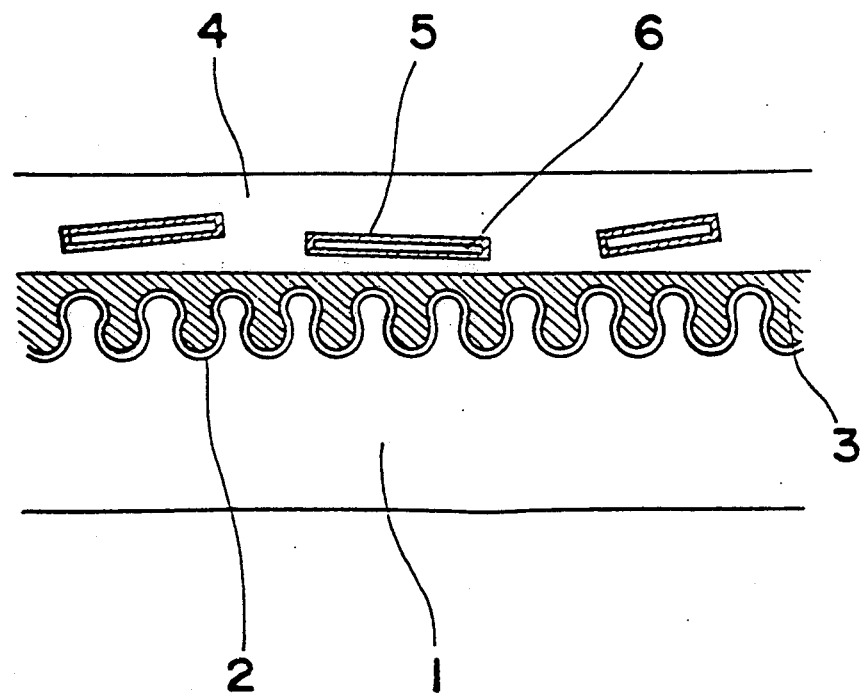
FIG. 1 shows a schematic cross section of an embodiment of a chromatically colorable fluororesin-coated material according to the present invention.

The present invention will be illustrated in more detail below.

The present inventors have eagerly made studies on the problems associated with the prior art and found that (I) when a fluororesin composition containing not more than 7% by weight, based on the total solid amount of the composition, of mica having a particle size of from 5 to 200 μm and containing neither any inorganic pigment having a particle size of smaller than 5 μm or larger than 200 μm nor any heat-resistant high-molecular material are used, surface non-tackiness is scarcely deteriorated in comparison with pure fluororesins.

However, when only mica having a particle size of from 5 to 200 μm is blended and carbon, titanium oxide, silica or metallic powder is not blended, non-uniformity of color is caused even with unevenness in coating thickness obtained by general industrial production and a good appearance cannot be obtained.

The present inventors have made further studies and found that (II) when mica to be blended is coated with an inorganic pigment, non-uniformity in color is not formed with unevenness in coating thickness obtained by general industrial production under such conditions that: an optical thickness (which is the product of the geometrical thickness and the refractive index) coated is from 0.2 to 0.4 μm when the inorganic pigment is a transparent pigment; only an opaque pigment is used as the inorganic pigment with which mica is coated; or a mixture or a laminate of the opaque inorganic pigment and the transparent inorganic pigment is used; and the inorganic pigment-coated mica is used in an amount of not less than 1% by weight based on the total solid amount of the composition.

The present inventors have found that when the above findings (I) and (II) are combined together and applied as the second layer, and a primer comprising a first fluororesin composition containing from 10 to 40% by weight, based on the total solid amount of the first fluororesin composition, of a heat-resistant high-molecular weight material is coated as the first layer, a fluororesin-coated material can be obtained which has a chromatically colored good appearance with uniformity in color without causing lowering in surface non-tackiness while maintaining excellent wear resistance. The present invention has been achieved on the basis of the above findings.

FIG. 1 shows a schematic cross section of an embodiment of a fluororesin-coated material according to the present invention. Numeral 1 represents a metallic substrate composed of an aluminum alloy, 2 represents a hard alumite layer, 3 represents a first fluororesin composition containing a heat-resistant high-molecular weight material (primer), 4 represents a second fluororesin composition, 5 represents an inorganic pigment and 6 represents mica.

Examples of materials which can be used as the metallic substrate include aluminum, aluminum alloy, iron, stainless steel, titanium, etc., and alloys and composite materials thereof. Among these, aluminum and aluminum alloy are particularly preferred from the viewpoints of cost and easy processing. Fine recessed and protruded parts for an anchoring effect are preferably formed on the surface of the metallic substrate.

As methods for providing the fine recessed and protruded parts on the metallic substrate, any methods can be used without particular limitation, so long as there can be provided recessed and protruded parts which can hold the fluororesin during the coating of the fluororesin layer and allow the substrate and the fluororesin to be mechanically bounded to each other by an anchoring effect. Physical roughening such as blasting, chemical etching, electrochemical etching and combinations thereof are preferred. If desired, flame spraying of metals or inorganic materials or baking of porous inorganic adhesives may be conducted. It is more preferred that aluminum or an aluminum alloy is used as the metallic substrate and an alumite layer is provided on the fine recessed and protruded parts provided on the substrate by an anodizing process.

The thickness of the alumite layer is preferably 1 μm or less, and more preferably 0.5 μm or less.

The fine recessed and protruded parts is preferably provided to such an extent that if a pure PTFE is coated on the surface having the fine recessed and protruded parts, the peel strength is 2 kg/cm or more.

Many kinds of mica may be used in the present invention in which ratios of components are different from one another. Examples of the compositions of mica are as follows.

| Muscovite | $K_2Al_4(Si_3Al)_2O_{20}(OH)_4$ |
| Phlogopite | $K_2Mg_6(Si_3Al)_2O_{20}(OH)_4$ |
| Biotite | $K_2(MgFe^{2+})(Si_3Al)_2O_{20}(OH)_4$ |

Any of the above mica can be used in the present invention, and among these, muscovite is preferably used.

Although there is no particular limitation with regard to the inorganic pigments with which mica is coated, examples of the inorganic pigments include carbon black, iron hydroxide, iron oxide, iron ferrocyanide, chromium hydroxide, chromium oxide and titanium oxide. Among these, iron oxide is preferred as the opaque pigment, and titanium oxide is preferred as the transparent pigment.

When mica is coated with a transparent inorganic pigment typified by titanium oxide, it is necessary that an optical thickness (optical thickness=geometrical thickness × refractive index) is not less than 0.2 μm, but not more than 0.4 μm from the viewpoint of the necessity of color formation by interference of light. On the other hand, when inorganic pigments with which mica is coated are opaque, the thickness is not particularly limited.

The coating of the inorganic pigment may be carried out by mixing or laminating the transparent and opaque inorganic pigments. Various color tones can be obtained by the combinations of various kinds thereof or various thicknesses. Accordingly, such mixing or lamination is referred.

In any case, it is necessary that mica having a particle size of not smaller than 5 μm, but not larger than 200 μm, coated with the inorganic pigment is blended in an amount of not less than 1% by weight, but not more than 7% by weight based on the total solid amount of the second fluororesin composition for the second layer.

It is not preferred that an inorganic pigment having a particle size of smaller than 5 μm, an inorganic pigment having a particle size of larger than 200 μm, or a heat-resistant high-molecular material is used in the second layer. This is because an effect of preventing lowering in physical properties by limiting the particle size of the coloring inorganic pigment and the composition of the second layer is lost.

The particle size of the mica is preferably from 5 to 100 μm, and more preferably from 5 to 70 μm. The addition amount of the mica is preferably from 2 to 7% by weight, more preferably from 3 to 7% by weight, based on the total solid amount of the second fluororesin composition.

The mica coated with an inorganic pigment used in the present invention is commercially available or can be produced by conventional methods as described, e.g., in *Shikizai* (Coloring Materials), vol. 50, pp. 460 (1977).

Examples of the heat-resistant high-molecular weight material which is used in an amount of from 10 to 40% by weight in the primer of the first layer include, but are not limited to, polyamic acids, polyamideimides, polyimides, polyparabanic acid, polyether imide, polyphenylene sulfide, polyoxybenzoyl and polyether sulfone. Among these, polyamideimide, polyphenylene sulfide and polyether sulfone are preferably used.

The heat-resistant high-molecular weight materials must be used only in the primer layer, because the surface non-tackiness is greatly deteriorated by the addition thereof.

Examples of the fluororesins which can be used in the first and second layers of the present invention include polytetrafluoroethylene (PTFE), tetrafluoroethylenehexafluoropropylene copolymer (FEP), tetrafluoroethyleneperfluoroalkylvinyl ether (PFA), ethylene-tetrafluoroethylene copolymer (ETFE), polychlorotrifluoroethylene (PCTFE) and ethylenechlorotrifluoro-ethylene copolymer (ECTFE).

The fluororesins can be applied in any form of resin powder, aqueous dispersions of emulsion-polymerized fluororesins, dispersions of fluororesin powders dispersed in aqueous mediums, organosol of fluororesins and aqueous emulsions of organosol.

The first and second fluororesin layers may be formed by any conventional processes. For example, powder of the fluororesin composition may be coated on the substrate and then baked at a temperature higher than the crystalline melting point of the fluororesin, or a fluororesin dispersion containing from 30 to 60% by weight of the solid component and from 70 to 40% by weight of a liquid medium, e.g., water, is coated and then dried, followed by baking at a temperature higher than the crystalline melting point of the fluororesin. However, the present invention is not restricted to these method.

It is not excluded from the coated material of the present invention that a further coating is made on the surface of the coated material of the present invention. However, it is preferred that a further coating is not made on the surface of the second layer to utilize more effectively the feature of the coated material of the present invention in an economical manner.

The thickness of each of the first and second fluororesin layers is generally from 1 to 100 μm, preferably from 5 to 50 μm, and more preferably from 5 to 30 μm.

The particle size of mica defined in the present invention is a particle diameter obtained by optically measuring mica dispersed in a liquid medium by using a laser diffraction type particle size measuring device. The particle size corresponds to the diameter of a sphere where the maximum projected area of flaky mica is referred to as its cross section.

Requirements of maintaining excellent wear resistance and giving surface non-tackiness can be met simultaneously by coating, as the first layer, the first fluororesin composition continuing from 10 to 40% by weight, based on the total solid amount of the first fluororesin composition, of a heat-resistant high-molecular weight material on a metallic substrate and then coating, as the second layer, the second fluororesin composition containing from 1 to 7% by weight, based on the total solid amount of the second fluororesin composition, of mica having a particle size of from 5 to 200 μm and an inorganic pigment-coated surface and containing neither any inorganic pigment having a particle size of smaller than 5 μm and larger than 200 μm nor any heat-resistant high-molecular weight material, on the first layer.

This is because the heat-resistant high-resistant high-molecular weight material in the first layer is firmly bonded to the metallic substrate and wear resistance is greatly improved by an synergistic effect with mica in the second layer. Further, the particle size of mica coated with an inorganic pigment is from 5 to 200 μm, the amount of mica is limited to from 1 to 7% by weight based on the total solid amount of the second fluororesin composition and neither any inorganic pigment having a particle size of smaller than 5 μm or larger than 200 μm nor any heat-resistant high-molecular weight material are blended, whereby surface non-tackiness can be maintained.

Furthermore, when transparent inorganic pigments are used as the inorganic pigments with which mica is coated and an optical thickness (optical thickness=geometrical thickness × refractive index) coated is from 0.2 to 0.4 μm, reflected color of yellow, red, purple, blue or green which is a complementary color corresponding to transmitted color of purple, green, yellow, orange and red can be obtained by the interference effect of light transmitted through the inorganic pigment of the optical thickness of from 0.2 to 0.4 μm.

Conventional titanium oxide-coated mica which is industrially used has an optical thickness of about 0.14 μm and reflected color is white to silver so that non-uniformity in color due to unevenness in the thickness of the second layer is remarkable and color tone is monotone. However, when reflected color is yellow to green as in the present invention, non-uniformity in color is prevented and a good appearance can be obtained.

When opaque inorganic pigments, the mixtures of the transparent inorganic pigments and the opaque inorganic pigments, or the laminates of the transparent inorganic pigments and the opaque inorganic pigments are used as the inorganic pigments with which mica is coated, the colors of the opaque inorganic pigments can be obtained and a good appearance having uniformity in color can be obtained.

Particularly, when the transparent inorganic pigment is titanium oxide, a fine color is formed because of its high transparency, and wear resistance can be further improved by the high surface hardness thereof.

When the opaque inorganic pigment is iron oxide, a fine color, which is apparently wine red, with luster is formed since a red or brown color having a high hiding power can be attained.

When aluminum or an aluminum alloy is used as the metallic substrate and fine recessed and protruded parts are provided thereon by electrochemical etching, a physical adhesion effect can be imparted thereto so that still more firmer bonding can be obtained. Further, when a hard alumite layer is formed on the recessed and protruded surface thereof, wear resistance can be further improved by the high hardness thereof.

The present invention is now illustrated in greater detail by reference to the following examples which, however, should not be construed as being limited thereto.

EXAMPLES 1 TO 3 AND COMPARATIVE EXAMPLES 1 TO 6

An aluminum alloy sheet whose surface was blasted or electrochemically etched was used as the metallic substrate. The aluminum alloy sheet was coated with each of fluororesin compositions containing fillers to be incorporated in the first layer and the second layer to obtain each of fluororesin-coated materials having the first layer of about 15 μm and the second layer of about 25 μm, each combination of the fillers to be incorporated in the first and second layers being indicated in Table 1.

The fluororesin used was PTFE, the mica used was muscovite, and the heat-resistant high-molecular weight material was polyamideimide.

The peeling force (adhesion force) of the coating, non-tackiness, wear resistance and colorability were evaluated. The non-tackiness was determined by a force required for peeling off sugar when sugar was scorched on the surface of the fluororesin-coated material. The results are shown in Table 1. The results were evaluated by the following four grades.

A: Excellent
B: Good
C. Poor
D: Very poor

It is clear from Table 1 that the fluororesin coated materials which meets requirements of good physical properties as well as colorability can be obtained only when the fluororesin compositions within the scope of the present invention are used.

TABLE 1

| | Metallic substrate and surface treatment | First layer composition ratio (%) heat-resistant high-molecular material | Second layer Particle size (μm) | Surface coating | Composition ratio (%) | Kind | Composition ratio (%) |
|---|---|---|---|---|---|---|---|
| Comparative Example 1 | Aluminum alloy blasted | 16 | 10–16 | Titanium oxide optical thickness 0.14 μm | 3 | — | — |
| Comparative Example 2 | Aluminum alloy blasted | " | " | Titanium oxide optical thickness 0.14 μm | " | Carbon black | 1 |
| Example 1 | Aluminum alloy blasted | " | " | Titanium oxide optical thickness 0.4 μm | " | — | — |
| Example 2 | Aluminum alloy electrochemically etching | " | " | Titanium oxide optical thickness 0.4 μm | " | — | — |
| Example 3 | Aluminum alloy electrochemically etching | " | " | Titanium oxide optical thickness 0.3 μm | " | — | — |
| Comparative Example 3 | Aluminum alloy electrochemically etching | 16 | 10–60 | Titanium oxide optical thickness 0.4 μm | 3 | polyamideimide | 8 |
| Comparative Example 4 | Aluminum alloy electrochemically etching | 0 | " | Titanium oxide optical thickness 0.4 μm | " | — | — |
| Comparative Example 5 | Aluminum alloy electrochemically etching | 16 | 280 | Titanium oxide optical thickness 0.4 μm | " | — | — |
| Comparative Example 6 | Aluminum alloy electrochemically etching | " | 10–60 | Titanium oxide optical thickness 0.4 μm | 0.5 | — | — |

| | Colorability Evaluation | Adhesion (kg/cm) | Adhesion Evaluation | Non-tackiness[*1] (kg) | Non-tackiness[*1] Evaluation | Wear resistance[*2] Times | Wear resistance[*2] Evaluation | Total Evaluation |
|---|---|---|---|---|---|---|---|---|
| Comp. Ex. 1 | Silver | D | 2.1 | B | 3 | B | 35,000 | B | D |

TABLE 1-continued

| | | | | | | | | | |
|---|---|---|---|---|---|---|---|---|---|
| | non-uniformity | | | | | | | | |
| Comp. Ex. 2 | Silver | C | 1.7 | B | 7 | D | 40,000 | B | D |
| Ex. 1 | Green metallic luster | A | 2.0 | B | 3 | A | 35,000 | B | B |
| Ex. 2 | Green metallic luster | A | 2.8 | A | 2 | A | 50,000 | A | A |
| Ex. 3 | Purple metallic luster | A | 2.9 | A | 3 | A | 50,000 | A | A |
| Comp. Ex. 3 | Green metallic luster | A | 2.6 | A | 9 | D | 60,000 | A | D |
| Comp. Ex. 4 | Green metallic luster | A | 1.6 | B | 3 | A | 6,000 | D | D |
| Comp. Ex. 5 | Green metallic luster non-uniformity | C | 2.7 | A | 8 | D | 15,000 | C | D |
| Comp. Ex. 6 | Green metallic luster non-uniformity | C | 2.7 | A | 2 | A | 8,000 | D | D |

Note:
Composition ratio (%) being % by weight
*¹Adherend surface: 1 inch in diameter
*²The number of revolutions made till metallic surface was exposed in a rotary attrition test by using a stainless steel brush at 200° C.

The chromatically colorable fluororesin-coated material of the present invention can be chromatically colored with various tones without causing lowering in surface non-tackiness while maintaining excellent wear resistance. Accordingly, the fluororesin-coated material of the present invention can be widely used in the fields of kitchen utensils such as frying pans, household appliances, household goods such as system kitchen and other articles which require excellent functions as well as good appearance.

While the present invention has been described in detail and with reference to specific embodiments thereof, it is apparent to one skilled in the art that various changes and modifications can be made therein without departing from the spirit and the scope of the present invention.

What is claimed is:

1. A chromatically colored fluororesin-coated material comprising a metallic substrate having thereon (1) a first layer comprising a first fluororesin composition containing from 10 to 40% by weight, based on the total solid amount of said first fluororesin composition, of a heat-resistant high-molecular weight material; and having further thereon (2) a second layer comprising a second fluororesin composition containing from 1 to 7% by weight, based on the total solid amount of said second fluororesin composition, of mica having a particle size of from 5 to 200 μm and having an inorganic pigment-coated surface, and containing neither any inorganic pigment having a particle size of smaller than 5 μm or larger than 200 μm nor any heat-resistant high-molecular material,
said inorganic pigment with which the surface of said mica is coated being at least one member selected from the group consisting of the following members (a) to (d):
(a) a transparent inorganic pigment which is coated with an optical thickness of from 0.2 to 0.4 μm,
(b) an opaque inorganic pigment,
(c) a mixture of a transparent inorganic pigment and an opaque inorganic pigment, and
(d) a laminate of a transparent inorganic pigment and an opaque inorganic pigment.

2. A chromatically colored fluororesin-coated material as claimed in claim 1, wherein said opaque inorganic pigment is iron oxide and said transparent inorganic pigment is titanium oxide.

3. A chromatically colored fluororesin-coated material comprising a metallic substrate having thereon (1) a first layer comprising a first fluororesin composition containing from 10 to 40% by weight, based on the total solid amount of said first fluororesin composition, of a heat-resistant high-molecular weight material; and having further thereon (2) a second layer comprising a second fluororesin composition containing from 1 to 7% by weight, based on the total solid amount of said second fluororesin composition, of mica having a particle size of from 5 to 200 μm and having an inorganic pigment-coated surface, and containing neither any inorganic pigment having a particle size of smaller than 5 μm or larger than 200 μm nor any heat-resistant high-molecular material,
said inorganic pigment with which the surface of said mica is coated being at least one member selected from the group consisting of the following members (a) to (d):
(a) a transparent inorganic pigment which is coated with an optical thickness of from 0.2 to 0.4 μm,
(b) an opaque inorganic pigment,
(c) a mixture of a transparent inorganic pigment and an opaque inorganic pigment, and
(d) a laminate of a transparent inorganic pigment and an opaque inorganic pigment,
wherein said metallic substrate has fine recessed and protruding parts formed by electrochemical etching and is aluminum or an aluminum alloy, the surface of which is coated with hard alumite.

4. A chromatically colored fluororesin-coated material as claimed in claim 3, wherein said opaque inorganic pigment is iron oxide and said transparent inorganic pigment is titanium oxide.

5. A chromatically colored fluororesin-coated material as claimed in claim 3, wherein the high-molecular weight material is selected from the group consisting of polyamic acids, polyamideimides, polyimides, polyparabanic acid, polyether imide, polyphenylene sulfide, polyoxybenzoyl and polyether sulfone.

6. A chromatically colored fluororesin coated material comprising a metallic substrate having thereon (1) a first layer comprising a first fluororesin composition containing from 10 to 40% by weight, based on the total solid amount of said first fluororesin composition, of a heat-resistant high-molecular weight material; and having further thereon (2) a second layer comprising a second fluororesin composition containing from 1 to 7% by weight, based on the total solid amount of said second fluororesin composition, of mica having a particle size of from 5 to 200 μm and having an inorganic pigment-coated surface, and containing neither any inorganic pigment having a particle size of smaller than 5 μm or larger than 200 μm nor any heat-resistant high-molecular material, said inorganic pigment with which the surface of said mica is coated being at least one member selected from the group consisting of the following members (a) to (d):

(a) a transparent inorganic pigment which is coated with an optical thickness of from 0.2 to 0.4 μm,
(b) an opaque inorganic pigment,
(c) a mixture of a transparent inorganic pigment and an opaque inorganic pigment, and
(d) a laminate of a transparent inorganic pigment and an opaque inorganic pigment; and said high-molecular weight material is selected from the group consisting of polyamic acids, polyamideimides, polyimides, polyparabanic acid, polyether imide, polyphenylene sulfide, polyoxybenzoyl and polyether sulfone.

* * * * *